United States Patent
Kim

(10) Patent No.: US 9,948,231 B2
(45) Date of Patent: Apr. 17, 2018

(54) METHOD AND APPARATUS FOR CONTROLLING VIBRATION INTENSITY ACCORDING TO SITUATION AWARENESS IN ELECTRONIC DEVICE

(71) Applicant: Samsung Electronics Co. Ltd., Suwon-si, Gyeonggi-do (KR)

(72) Inventor: Min-Young Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1148 days.

(21) Appl. No.: 13/908,437

(22) Filed: Jun. 3, 2013

(65) Prior Publication Data
US 2014/0049883 A1 Feb. 20, 2014

(30) Foreign Application Priority Data
Aug. 20, 2012 (KR) .................. 10-2012-0090803

(51) Int. Cl.
H04M 1/725 (2006.01)
H02P 31/00 (2006.01)
H04M 19/04 (2006.01)

(52) U.S. Cl.
CPC ........ *H02P 31/00* (2013.01); *H04M 1/72569* (2013.01); *H04M 19/047* (2013.01)

(58) Field of Classification Search
CPC ............... H02P 31/00; H04M 1/72519; H04M 1/72569; H04M 19/047
(Continued)

(56) References Cited

U.S. PATENT DOCUMENTS 6,469,460 B1* 10/2002 Im .................... H04M 19/04
318/16
6,774,769 B2* 8/2004 Okada .................... B06B 1/023
340/407.1
(Continued)

FOREIGN PATENT DOCUMENTS

CN 101394439 A 3/2009
JP 2000-270369 A 9/2000
(Continued)

OTHER PUBLICATIONS

JP2004-139120A, Apr. 22, 2004, machine translation retrieved from "J-PlatPat" <https://www4.j-platpat.inpit.go.jp/eng/tokujitsu/tkbs_en/TKBS_EN_GM101_Top.action> on Aug. 9, 2016.*
(Continued)

*Primary Examiner* — Jason D Mitchell
(74) *Attorney, Agent, or Firm* — Jefferson IP Law, LLP

(57) ABSTRACT

A method of controlling vibration is provided. The method includes determining whether the electronic device is located on a flat surface if a vibration event of an electronic device occurs, measuring a first noise signal level before driving a vibration motor by using a microphone of the electronic device if the electronic device is located on the flat surface, measuring a second noise signal level after driving the vibration motor at a minimum vibration intensity, and controlling a driving intensity of the vibration motor by comparing the first noise signal level and the second noise signal level. Accordingly, an excessive noise may be avoided if a portable terminal vibrates on a hard surface such as a desk.

14 Claims, 9 Drawing Sheets

(58) Field of Classification Search
USPC .......................................................... 700/280
See application file for complete search history.

(56) References Cited

U.S. PATENT DOCUMENTS

| | | | | |
|---|---|---|---|---|
| 8,170,621 | B1* | 5/2012 | Lockwood | ........ H04W 52/0254 |
| | | | | 455/550.1 |
| 2005/0282590 | A1 | 12/2005 | Haparnas | |
| 2006/0153358 | A1* | 7/2006 | Zernovizky | ......... H04M 19/044 |
| | | | | 379/392.01 |
| 2009/0295832 | A1* | 12/2009 | Takatsuka | ............... G06F 3/012 |
| | | | | 345/659 |
| 2011/0003615 | A1* | 1/2011 | Langereis | ............... G01S 15/04 |
| | | | | 455/556.1 |
| 2011/0075835 | A1 | 3/2011 | Hill | |
| 2011/0270679 | A1* | 11/2011 | Tziortzis | ................ G06Q 30/02 |
| | | | | 705/14.58 |
| 2012/0077480 | A1* | 3/2012 | DeLuca | ................ G06F 1/1688 |
| | | | | 455/418 |
| 2013/0281165 | A1 | 10/2013 | Ito et al. | |

FOREIGN PATENT DOCUMENTS

| | | | |
|---|---|---|---|
| JP | 2004-56623 | A | 2/2004 |
| JP | 2004-129120 | A | 4/2004 |
| KR | 10-2002-0092106 | A | 12/2002 |
| KR | 10-2011-0024865 | A | 3/2011 |
| KR | 20110024865 | * | 3/2011 |
| WO | 2012/090278 | A1 | 7/2012 |

OTHER PUBLICATIONS

JP 200-270369A, Sep. 29, 2000, machine translation retrieved from "J-PlatPat" <https://www4.j-platpat.inpit.go.jp/eng/tokujitsu/tkbs_en/TKBS_EN_GM101_Top.action> on Aug. 9, 2016.*

JP2004-056623A, Feb. 19, 2004, machine translation retrieved from "J-PlatPat" <https://www4.j-platpat.inpit.go.jp/eng/tokujitsu/tkbs_en/TKBS_EN_GM101_Top.action> on Aug. 9, 2016.*

* cited by examiner

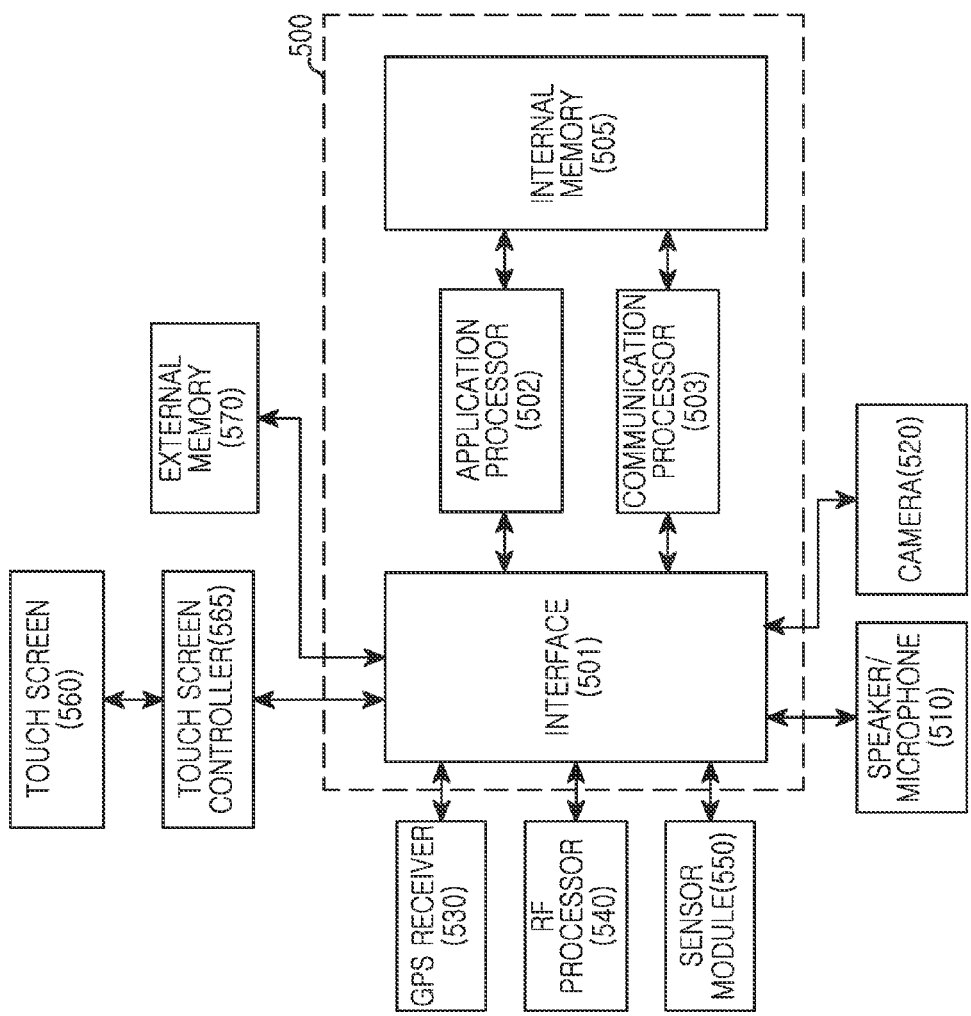

METHOD AND APPARATUS FOR CONTROLLING VIBRATION INTENSITY ACCORDING TO SITUATION AWARENESS IN ELECTRONIC DEVICE

PRIORITY

This application claims the benefit under 35 U.S.C. § 119(a) of a Korean patent application filed in the Korean Intellectual Property Office on Aug. 20, 2012 and assigned Serial No. 10-2012-0090803, the entire disclosure of which is hereby incorporated by reference.

BACKGROUND OF THE INVENTION

1. Field of the Invention

The present invention relates to an electronic device. More particularly, the present invention relates to a method and apparatus for controlling a driving intensity of a vibration motor in an electronic device.

2. Description of the Related Art

When a portable terminal receives a call in a vibration mode, the call is reported to a user by vibrating a vibration motor instead of making a bell sound. The vibration of the portable terminal is generated by driving the vibration motor included in the portable terminal, and strength of the vibration may be constant according to a pre-set vibration intensity.

When the vibrating portable terminal is located on a hard surface, such as a desk, the vibration may cause the generation of an excessive noise due to the portable terminal vibrating on the hard surface. The generation of such a high-level of noise does not meet a purpose of the vibration mode, that purpose being silent operation of the portable terminal and noise prevention, which results in inconvenience of use.

However, if the vibration motor is designed to have a weak vibration strength to address this problem, the user may not be able to recognize the vibration when the portable terminal is grabbled by a hand of the user or is located in a pocket or a bag.

Accordingly, there is a need for a method and apparatus for controlling a vibration intensity in a portable terminal according to situation awareness.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for controlling vibration intensity in an electronic device according to situation awareness.

Another aspect of the present invention is to provide a method and apparatus for decreasing vibration intensity when a portable terminal is located on a hard surface such as a desk while eliminating an excessive noise generated if the portable terminal vibrates on the hard surface.

In accordance with an aspect of the present invention, a method of controlling vibration is provided. The method includes, determining whether the electronic device is located on a flat surface if a vibration event of an electronic device occurs, measuring a first noise signal level before driving a vibration motor by using a microphone of the electronic device if the electronic device is located on the flat surface, measuring a second noise signal level after driving the vibration motor at a minimum vibration intensity, and controlling a driving intensity of the vibration motor by comparing the first noise signal level and the second noise signal level.

In an exemplary embodiment of the present invention, the determining of whether the electronic device is located on the flat surface comprises analyzing at least one detection signal by using at least one of an acceleration sensor, a gyroscopic sensor, and a proximity sensor.

In an exemplary embodiment of the present invention, the method further includes driving the vibration motor at a pre-set vibration intensity if the electronic device is not located on the flat surface.

In accordance with an aspect of the present invention, a method of controlling vibration is provided. The method includes determining whether the electronic device is located on a flat surface if a vibration event of an electronic device occurs, measuring a first noise signal level after driving a vibration motor at a minimum vibration intensity by using a microphone of the electronic device if the electronic device is located on the flat surface, measuring a second noise signal level after removing a noise generated due to the driving of the vibration motor by filtering the first noise signal, and controlling a driving intensity of the vibration motor by comparing the first noise signal level and the second noise signal level.

In an exemplary embodiment of the present invention, the determining of whether the electronic device is located on the flat surface comprises analyzing at least one detection signal by using at least one of an acceleration sensor, a gyroscopic sensor, and a proximity sensor.

In an exemplary embodiment of the present invention, the method further includes driving the vibration motor at a pre-set vibration intensity if the electronic device is not located on the flat surface.

In accordance with an aspect of the present invention, a method of controlling vibration is provided. The method includes determining whether the electronic device is located on a flat surface if a vibration event of an electronic device occurs, measuring a noise signal level after driving a vibration motor at a minimum vibration intensity by using a microphone of the electronic device if the electronic device is located on the flat surface, and increasing a driving intensity of the vibration motor by one level if the measured noise signal level is less than a threshold.

In an exemplary embodiment of the present invention, the determining of whether the electronic device is located on the flat surface comprises analyzing at least one detection signal by using at least one of an acceleration sensor, a gyroscopic sensor, and a proximity sensor.

In an exemplary embodiment of the present invention, the method further includes driving the vibration motor at a pre-set vibration intensity if the electronic device is not located on the flat surface.

In accordance with an aspect of the present invention, a method of controlling vibration is provided. The method includes determining whether the electronic device is located on a flat surface if a vibration event of an electronic device occurs, measuring a noise signal level after driving a vibration motor at a minimum vibration intensity by using a microphone of the electronic device if the electronic device is located on the flat surface, extracting a noise generated due to the driving of the vibration motor by filtering the noise signal, and increasing a driving intensity of the vibration motor by one level if the noise generated due to the driving of the vibration motor is less than a threshold.

In an exemplary embodiment of the present invention, the determining of whether the electronic device is located on the flat surface comprises analyzing at least one detection signal by using at least one of an acceleration sensor, a gyroscopic sensor, and a proximity sensor.

In an exemplary embodiment of the present invention, the method further includes driving the vibration motor at a pre-set vibration intensity if the electronic device is not located on the flat surface.

In accordance with an aspect of the present invention, a method of controlling vibration is provided. The method includes determining whether the electronic device is located on a flat surface if a vibration event of an electronic device occurs, measuring a first noise signal level after driving a vibration motor at a minimum vibration intensity by using a microphone of the electronic device if the electronic device is located on the flat surface, deactivating the vibration motor, measuring a second noise signal level after deactivating the vibration motor and before again driving the vibration motor by using the microphone of the electronic device, and controlling a driving intensity of the vibration motor by comparing the first noise signal level and the second noise signal level.

In an exemplary embodiment of the present invention, the determining of whether the electronic device is located on the flat surface comprises analyzing at least one detection signal by using at least one of an acceleration sensor, a gyroscopic sensor, and a proximity sensor.

In an exemplary embodiment of the present invention, the method further includes driving the vibration motor at a pre-set vibration intensity if the electronic device is not located on the flat surface. In accordance with an aspect of the present invention, an electronic device of controlling vibration is provided. The electronic device includes a vibration motor, at least one processor, a memory, and at least one instruction set stored in the memory and configured to be executed by the at least one processor. The at least one instruction set includes an instruction for determining whether the electronic device is located on a flat surface if a vibration event of an electronic device occurs, an instruction for measuring a first noise signal level before driving a vibration motor by using a microphone of the electronic device if the electronic device is located on the flat surface, an instruction for measuring a second noise signal level after driving the vibration motor at a minimum vibration intensity, and an instruction for controlling a driving intensity of the vibration motor by comparing the first noise signal level and the second noise signal level.

In an exemplary embodiment of the present invention, the instruction for controlling the driving intensity of the vibration motor by comparing the first noise signal level and the second noise signal level comprises an instruction for increasing the driving intensity of the vibration motor by one level if a difference of the first noise signal level and the second noise signal level is less than a threshold and an instruction for maintaining the current driving intensity of the vibration motor if the difference of the first noise signal level and the second noise signal level is greater than the threshold.

In an exemplary embodiment of the present invention, the instruction for measuring the second noise signal level after driving the vibration motor at the minimum vibration intensity comprises an instruction for determining an oscillation frequency of the vibration motor, an instruction for filtering a noise generated due to the driving of the vibration motor from the second noise signal according to the oscillation frequency of the vibration motor and an instruction for measuring the filtered second noise signal level.

In an exemplary embodiment of the present invention, the instruction for determining whether the electronic device is located on the flat surface comprises an instruction for analyzing at least one detection signal by using at least one of an acceleration sensor, a gyroscopic sensor, and a proximity sensor.

In an exemplary embodiment of the present invention, the instruction set further comprises an instruction for driving the vibration motor at a pre-set vibration intensity if the electronic device is not located on the flat surface.

In accordance with an aspect of the present invention, an electronic device is provided. The electronic device includes a vibration motor, at least one processor, a memory, and at least one instruction set stored in the memory and configured to be executed by the at least one processor. The at least one instruction set includes an instruction for determining whether the electronic device is located on a flat surface if a vibration event of an electronic device occurs, an instruction for measuring a first noise signal level after driving a vibration motor at a minimum vibration intensity by using a microphone of the electronic device if the electronic device is located on the flat surface, an instruction for measuring a second noise signal level after removing noise generated due to the driving of the vibration motor by filtering the first noise signal, and an instruction for controlling a driving intensity of the vibration motor by comparing the first noise signal level and the second noise signal level.

In an exemplary embodiment of the present invention, the instruction for controlling the driving intensity of the vibration motor by comparing the first noise signal level and the second noise signal level comprises an instruction for increasing the driving intensity of the vibration motor by one level if a difference of the first noise signal level and the second noise signal level is less than a threshold and an instruction for maintaining the current driving intensity of the vibration motor if the difference of the first noise signal level and the second noise signal level is greater than the threshold.

In an exemplary embodiment of the present invention, the instruction for measuring the first noise signal level after driving the vibration motor at the minimum vibration intensity comprises an instruction for determining an oscillation frequency of the vibration motor, an instruction for filtering a noise generated due to the driving of the vibration motor from the first noise signal according to the oscillation frequency of the vibration motor and an instruction for measuring the filtered first noise signal level.

In an exemplary embodiment of the present invention, the instruction for determining whether the electronic device is located on the flat surface comprises an instruction for analyzing at least one detection signal by using at least one of an acceleration sensor, a gyroscopic sensor, and a proximity sensor.

In an exemplary embodiment of the present invention, the instruction set further comprises an instruction for driving the vibration motor at a pre-set vibration intensity if the electronic device is not located on the flat surface.

In accordance with an aspect of the present invention, an electronic device is provided. The electronic device includes a vibration motor, at least one processor, a memory, and at least one instruction set stored in the memory and configured to be executed by the at least one processor. The at least one instruction set includes an instruction for determining whether the electronic device is located on a flat surface if a vibration event of an electronic device occurs, an instruction for measuring a noise signal level after driving a vibration motor at a minimum vibration intensity by using a microphone of the electronic device if the electronic device is located on the flat surface, and an instruction for increasing a driving intensity of the vibration motor by one level if the measured noise signal level is less than a threshold.

In an exemplary embodiment of the present invention, the instruction set further comprises an instruction for maintaining the current driving intensity of the vibration motor if the noise signal level is greater than the threshold.

In an exemplary embodiment of the present invention, the instruction for determining whether the electronic device is located on the flat surface comprises an instruction for analyzing at least one detection signal by using at least one of an acceleration sensor, a gyroscopic sensor, and a proximity sensor.

In an exemplary embodiment of the present invention, the instruction set further comprises an instruction for driving the vibration motor at a pre-set vibration intensity if the electronic device is not located on the flat surface.

In accordance with an aspect of the present invention, an electronic device is provided. The electronic device includes a vibration motor, at least one processor, a memory, and at least one instruction set stored in the memory and configured to be executed by the at least one processor. The at least one instruction set includes an instruction for determining whether the electronic device is located on a flat surface if a vibration event of an electronic device occurs, an instruction for measuring a noise signal level after driving a vibration motor at a minimum vibration intensity by using a microphone of the electronic device if the electronic device is located on the flat surface, an instruction for extracting a noise generated due to the driving of the vibration motor by filtering the noise signal, and an instruction for increasing a driving intensity of the vibration motor by one level if the noise generated due to the driving of the vibration motor is less than a threshold.

In an exemplary embodiment of the present invention, the instruction set further comprises an instruction for maintaining the current driving intensity of the vibration motor if the noise generated due to the driving of the vibration motor is greater than the threshold.

In an exemplary embodiment of the present invention, the instruction for extracting the noise generated due to the driving of the vibration motor by filtering the noise signal comprises an instruction for determining an oscillation frequency of the vibration motor, an instruction for filtering a noise generated due to the driving of the vibration motor from the noise signal on the basis of the oscillation frequency of the vibration motor and an instruction for measuring the filtered noise signal level.

In an exemplary embodiment of the present invention, the instruction for determining whether the electronic device is located on the flat surface comprises an instruction for analyzing at least one detection signal by using at least one of an acceleration sensor, a gyroscopic sensor, and a proximity sensor.

In an exemplary embodiment of the present invention, the instruction set further comprises an instruction for driving the vibration motor at a pre-set vibration intensity if the electronic device is not located on the flat surface.

In accordance with an aspect of the present invention, an electronic device is provided. The electronic device includes a vibration motor, at least one processor, a memory, and at least one instruction set stored in the memory and configured to be executed by the at least one processor. The at least one instruction set includes an instruction for determining whether the electronic device is located on a flat surface if a vibration event of an electronic device occurs, an instruction for measuring a first noise signal level after driving a vibration motor at a minimum vibration intensity by using a microphone of the electronic device if the electronic device is located on the flat surface, an instruction for deactivating the vibration motor, an instruction for measuring a second noise signal level after the deactivating of the vibration motor and before again driving the vibration motor by using the microphone of the electronic device, and an instruction for controlling a driving intensity of the vibration motor by comparing the first noise signal level and the second noise signal level.

In an exemplary embodiment of the present invention, the instruction for controlling the driving intensity of the vibration motor by comparing the first noise signal level and the second noise signal level comprises an instruction for increasing the driving intensity of the vibration motor by one level if a difference of the first noise signal level and the second noise signal level is less than a threshold and an instruction for maintaining the current driving intensity of the vibration motor if the difference of the first noise signal level and the second noise signal level is greater than the threshold.

In an exemplary embodiment of the present invention, the instruction for determining whether the electronic device is located on the flat surface comprises an instruction for analyzing at least one detection signal by using at least one of an acceleration sensor, a gyroscopic sensor, and a proximity sensor.

In an exemplary embodiment of the present invention, the instruction set further comprises an instruction for driving the vibration motor at a pre-set vibration intensity if the electronic device is not located on the flat surface.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIG. 5 is a block diagram illustrating an electronic device according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and configurations may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention described hereinafter relate to a method and apparatus for controlling vibration intensity according to situation awareness in an electronic device. In particular, exemplary embodiments of the present invention relate to a method and apparatus for controlling a vibration report in various mobile devices such as a mobile phone, a tablet, and other similar mobile devices, and relates to a method and apparatus for decreasing an excessive noise generated when a vibration occurs on a hard surface, such as a desk.

Figure 1A:
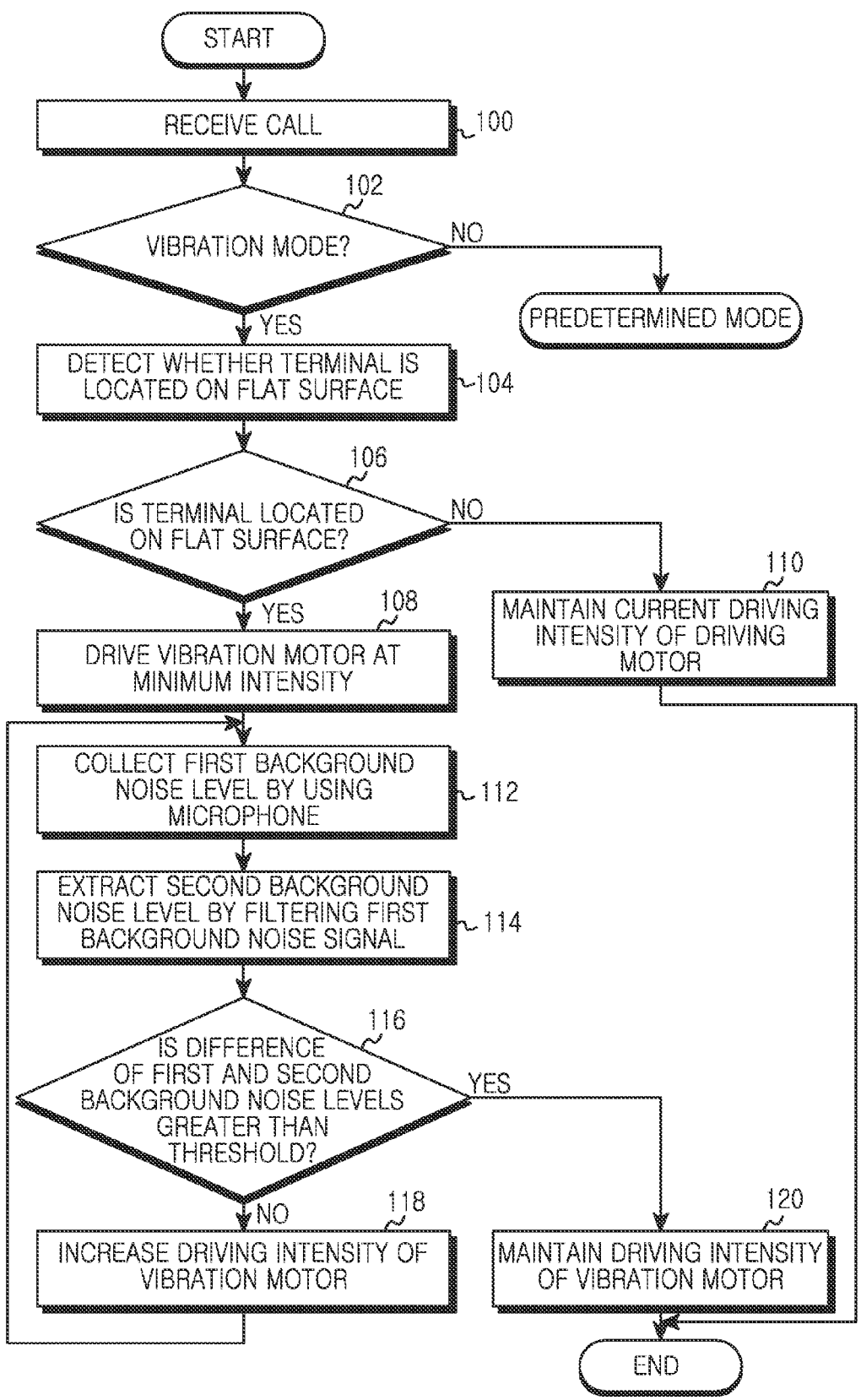
FIG. 1A is a flowchart illustrating a process of controlling a vibration intensity on the basis of situation awareness in an electronic device according to an exemplary embodiment of the present invention.

FIG. 1A is a flowchart illustrating a process of controlling a vibration intensity on the basis of situation awareness in an electronic device according to an exemplary embodiment of the present invention.

Referring to FIG. 1A, when an event such as receiving a call occurs in step 100, the electronic device determines whether it is set to a vibration mode in step 102. However, the present invention is not limited thereto, and the event that occurs at step 100 may be receiving a text, an alarm, or any other similar and/or suitable event that is reported on the electronic device. If the electronic device is not set to the vibration mode in step 102, then a predetermined mode is performed. For example, in the predetermined mode, the electronic device makes a bell sound for a call event.

Otherwise, if the electronic device is set to the vibration mode in step 102, then the electronic device, in step 104, detects whether the electronic device is currently located on a flat surface on the basis of a detection signal of a sensor, e.g., an acceleration sensor, a gyroscopic sensor, a proximity sensor, or any other similar and/or suitable sensor included in the electronic device, before driving the vibration motor. Then, in step 206, the electronic device determines whether the electronic device is currently located on the flat and/or hard surface by analyzing at least one of sensing results of the sensor. A detailed algorithm for determining whether the electronic device is currently located on the flat and/or hard surface is beyond the scope of the present exemplary embodiment, and thus, will not be discussed herein for the purpose of brevity.

If it is determined, in step 106, that the electronic device is not located on the flat surface, then, in step 110, the electronic device drives the vibration motor at a pre-set driving intensity by determining that the electronic device is located in a user's hand, bag, pocket, or any other similar location that is not a flat and/or hard surface, and thus an excessive noise is not generated in this situation. That is, the electronic device vibrates while maintaining a current driving intensity of the vibration motor. Otherwise, if it is determined in step 106 that the electronic device is located on the flat surface, then in step 108, the electronic device drives the vibration motor at a minimum level of the driving intensity.

In step 112, the electronic device measures a first background noise signal level by using a microphone. According to another exemplary embodiment, before driving the vibration motor at the minimum level of the driving intensity, a noise level for a case where the vibration motor is not driven may be measured by using the microphone if it is determined that the electronic device is located on the flat surface.

In step 114, the electronic device filters the first background noise signal to remove a noise signal generated due to the vibration of the vibration motor, wherein, such a noise signal may be called a third noise signal, from the first background noise signal which is input through the microphone. Hereinafter, the filtered signal may be called a second background noise signal. In other words, the second background noise signal is a signal in which the noise signal generated due to the vibration of the vibration motor, i.e., the third noise signal, is removed from the first background noise signal. Since an oscillation frequency of the vibration motor may be predetermined, a filter's pass frequency may be determined. Furthermore, the oscillation frequency of the vibration motor is a frequency at which the vibration motor oscillates or moves between a starting position and an ending position. The oscillation frequency may be predetermined, varied, and/or determined by the electronic device. The filter may be implemented both in software and in hardware.

In step 116, it is determined whether a difference of a second background noise signal level and a first background noise signal level is less than a threshold, and then, in step 118, the electronic device increases the driving intensity of the vibration motor if the difference is less than the threshold. For example, the electronic device increases the driving intensity of the vibration motor by one level from among a plurality of driving intensity levels. Otherwise, if the difference of the second background noise signal level and the first background noise signal level is greater than the threshold, then the current driving intensity of the vibration motor is maintained in step 120. In other words, the difference between the second background noise signal level and the first background noise signal level being greater than the threshold implies that a vibration noise caused by the vibration motor is large, and the difference between the second background noise signal level and the first background noise signal level being less than the threshold implies that the vibration noise caused by the vibration motor is small. Therefore, when the vibration noise caused by the vibration motor is small, the current driving intensity of the vibration motor is increased, and when the vibration noise caused by the vibration motor is large, then the driving intensity of the vibration motor is maintained to satisfy a current threshold. The threshold may be a value corresponding to a signal level, a noise level, and/or a volume level. Thereafter, the procedure of FIG. 1A ends.

It is described above with reference to FIG. 1A that, in step 108, the vibration motor is driven at the minimum intensity to measure the first noise signal level including the vibration noise, and thereafter the driving intensity of the vibration motor is controlled by comparing the measurement result with the second noise signal level of which the vibration noise is filtered through the filter.

According to another exemplary embodiment, it is also possible in FIG. 1A that, before driving the vibration motor at the minimum intensity in step 108, the first noise signal level not including the vibration noise is measured, thereafter the second noise signal level including the vibration noise is measured by driving the vibration motor at the minimum intensity, and thereafter the vibration noise is removed by filtering the second noise signal. In addition, the driving intensity of the vibration motor is controlled by comparing the first noise signal level for a case where the vibration motor is not driven with the filtered second noise signal level. For example, if a noise generated when the vibration motor is driven is not large, i.e., if the generated noise level is almost the same as a maximum acceptable noise level value, then the driving intensity of the vibration motor is increased. Otherwise, if a noise level value generated when the vibration motor is driven is appropriate, i.e., if the generated noise level is almost the same as a maximum acceptable noise level, then the driving intensity of the vibration motor is maintained.

That is, even after the driving intensity of the vibration motor is increased, the driving intensity of the vibration motor is regulated until it reaches the acceptable noise level by repeating the steps 112 to 118. An instruction set for each step of FIG. 1A may be stored as one or more non-transient computer readable storage mediums or modules in memories 505 and 570 of FIG. 5. In this case, the module stored in the memory can be executed by one or more processors.

Figure 1B:
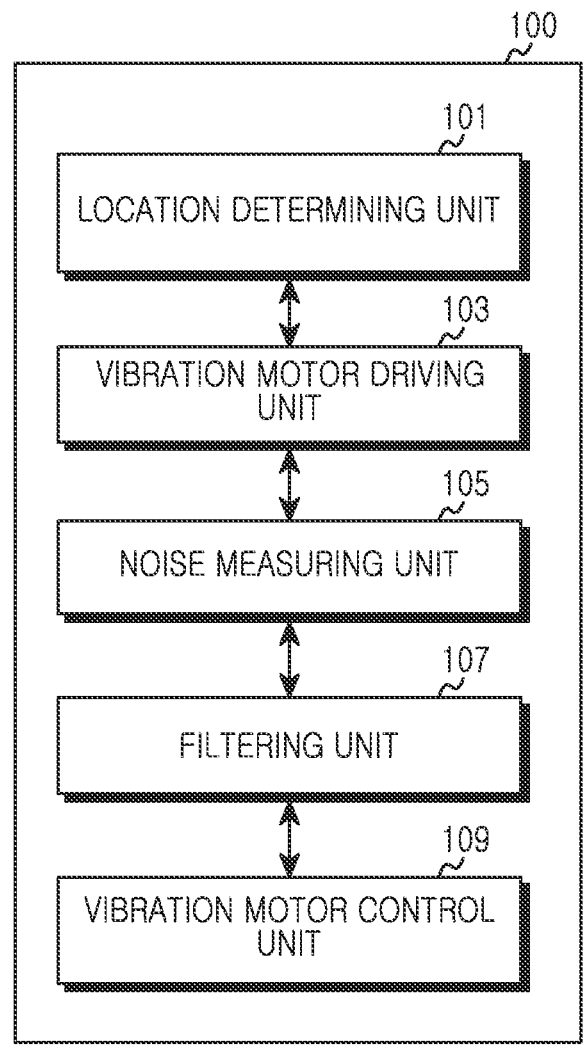
FIG. 1B is a block diagram illustrating an apparatus for controlling a vibration intensity on the basis of situation awareness in an electronic device according to an exemplary embodiment of the present invention.

FIG. 1B is a block diagram illustrating an apparatus for controlling a vibration intensity on the basis of situation awareness in an electronic device according to an exemplary embodiment of the present invention.

An electronic device 100 includes a location determining unit 101 for determining whether the electronic device 100 is currently located on a flat surface on the basis of a detection signal of a sensor, e.g., an acceleration sensor, a gyroscopic sensor, a proximity sensor, or any other similar and/or suitable sensor included in the electronic device 100, before driving the vibration motor, a vibration motor diving unit 103 for driving the vibration motor at a minimum level of driving intensity if it is determined that the electronic device is not located on the flat surface, a noise measuring unit 105 for measuring a first background noise signal level by using a microphone, a filtering unit 107 for filtering the first background noise signal to remove a noise signal generated due to the vibration of the vibration motor, from the first background noise signal which is input through the microphone, and a vibration motor control unit 109 for controlling the driving intensity of the vibration motor by comparing the difference of the second background noise signal level and the first background noise signal level with a threshold. Hereinafter, the filtered signal is called a second background noise signal. The second background noise signal is a signal in which the noise signal generated due to the vibration of the vibration motor, i.e., the third noise signal, is removed from the first background noise signal.

For example, if a difference of a second background noise signal level and a first background noise signal level is less than a threshold, then the electronic device increases the driving intensity of the vibration motor, and otherwise if the difference of the second background noise signal level and the first background noise signal level is greater than the threshold, then the current driving intensity of the vibration motor is maintained.

As described above, the electronic device 100 drives the vibration motor at the minimum intensity to measure the first noise signal level including the vibration noise, and thereafter controls the driving intensity of the vibration motor by comparing the measurement result with the second noise signal level from which the vibration noise is filtered through the filtering unit 105.

According to another exemplary embodiment, it is also possible that, before driving the vibration motor at the minimum intensity, the first noise signal level not including the vibration noise is measured, thereafter the second noise signal level including the vibration noise is measured by driving the vibration motor at the minimum intensity, and thereafter the vibration noise is removed by filtering the second noise signal. In addition, the driving intensity of the vibration motor is controlled by comparing the first noise signal level for a case where the vibration motor is not driven with the filtered second noise signal level.

Figure 2A:
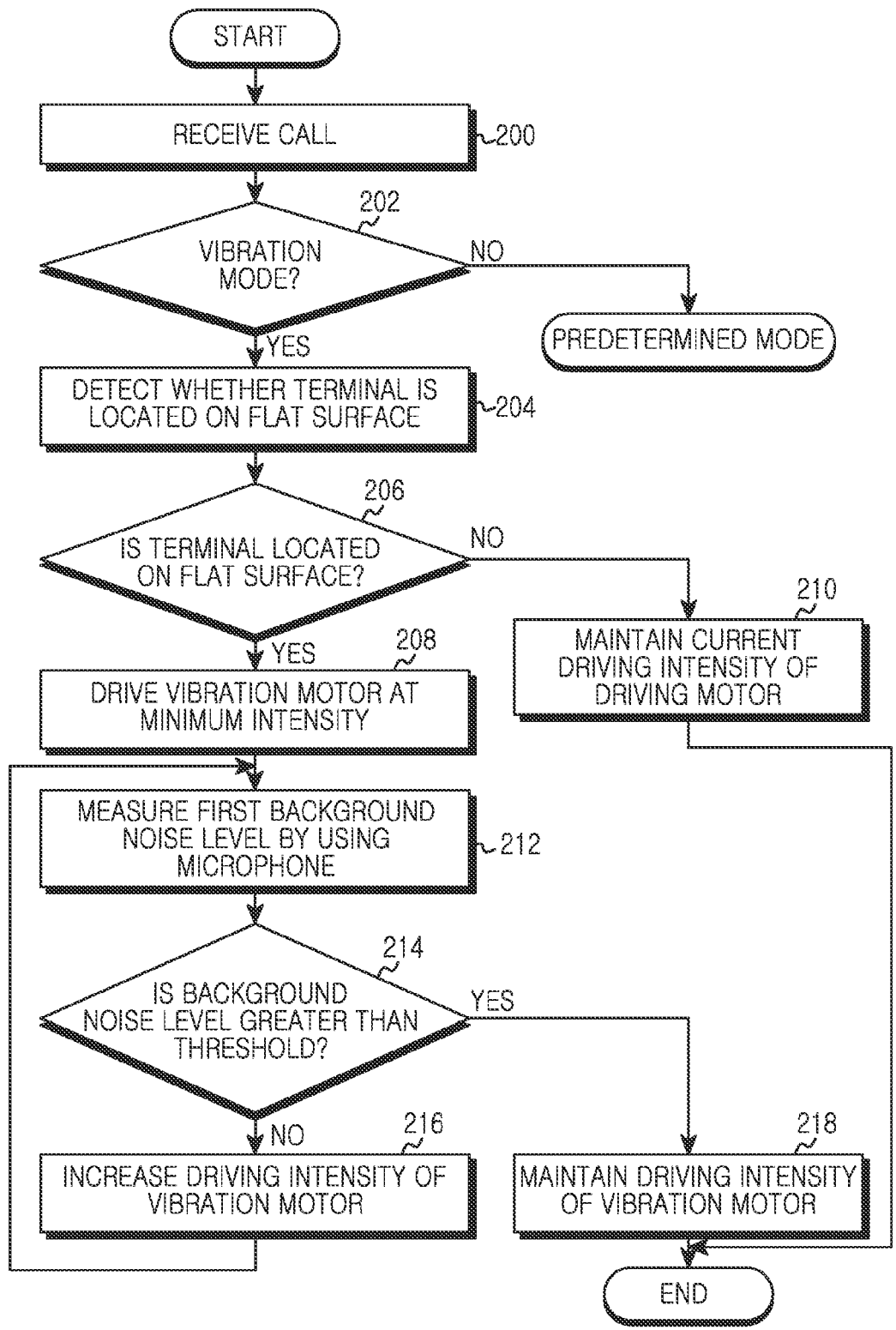
FIG. 2A is a flowchart illustrating a process of controlling a vibration intensity on the basis of situation awareness in an electronic device according to an exemplary embodiment of the present invention.

FIG. 2A is a flowchart illustrating a process of controlling a vibration intensity on the basis of situation awareness in an electronic device according to an exemplary embodiment of the present invention.

Referring to FIG. 2A, when an event, such as receiving a call, occurs in step 200, then the electronic device determines whether it is set to a vibration mode in step 202. If the electronic device is not set to the vibration mode in step 202, then a predetermined mode is performed. For example, in the predetermined mode, the electronic device makes a bell sound for a call event.

Otherwise, if the electronic device is set to the vibration mode in step 202, then, in step 204, the electronic device detects whether the electronic device is currently located on a flat surface on the basis of a detection signal of a sensor before driving the vibration motor. Then, in step 206, the electronic device determines whether the electronic device is currently located on the flat surface by analyzing at least one of sensing results of at least one sensor.

If it is determined, in step 206, that the electronic device is not located on the flat surface, then, in step 210, the electronic device drives the vibration motor at a pre-set driving intensity by determining that the electronic device is located in a user's hand, bag, pocket, etc., and thus an excessive noise is not generated in this situation. That is, the electronic device vibrates while maintaining a current driving intensity of the vibration motor. Otherwise, if it is determined, in step 206, that the electronic device is located on the flat surface, then, in step 208, the electronic device drives the vibration motor at a minimum level of the driving intensity. In step 212, the electronic device measures a background noise signal level including a vibration noise by using a microphone.

In step 214, it is determined if the background noise signal level including the vibration noise is less than a threshold, and then, in step 216, the electronic device increases the driving intensity of the vibration motor if the background noise signal level including the vibration noise is less than the threshold. Otherwise, if the background noise signal level including the vibration noise is greater than the threshold, then, in step 218, the current driving intensity of the vibration motor is maintained. In other words, if the background noise signal level including the vibration noise is large, it implies that a vibration noise caused by the vibration motor is large, and if the background noise signal level including the vibration noise is small, it implies that the vibration noise caused by the vibration motor is small. Therefore, when the vibration noise caused by the vibration motor is small, the current driving intensity of the vibration motor is increased, and when the vibration noise caused by the vibration motor is large, the driving intensity of the vibration motor is maintained to satisfy a current threshold. Thereafter, the procedure of FIG. 2A ends.

An instruction set for each step of FIG. 2A may be stored and executed in a manner similar to that of the instruction set for each step of FIG. 1A.

Figure 2B:
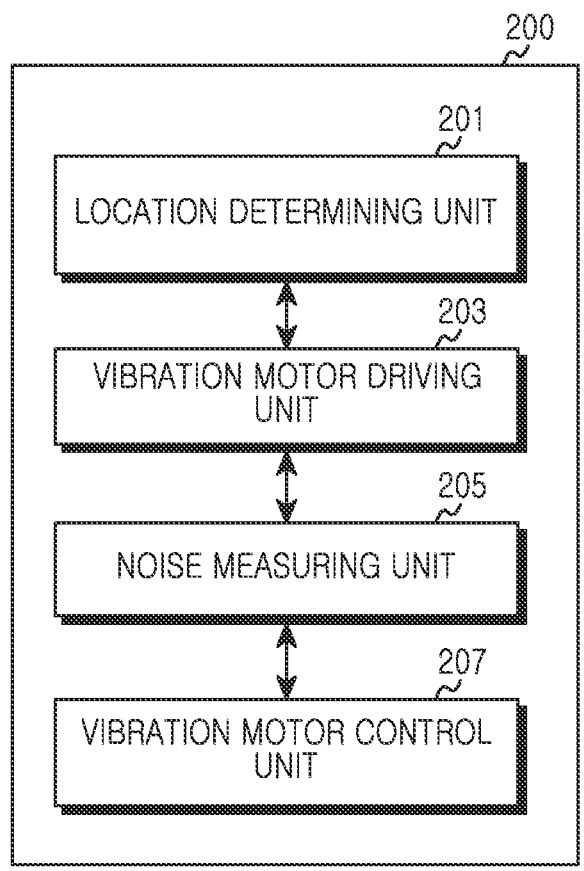
FIG. 2B is a block diagram illustrating an apparatus for controlling a vibration intensity on the basis of situation awareness in an electronic device according to an exemplary embodiment of the present invention.

FIG. 2B is a block diagram illustrating an apparatus for controlling a vibration intensity on the basis of situation awareness in an electronic device according to an exemplary embodiment of the present invention.

An electronic device 200 includes a location determining unit 201 for determining whether the electronic device 200 is currently located on a flat surface on the basis of a detection signal of a sensor before driving the vibration motor, a vibration motor driving unit 203 for driving the vibration motor at a minimum level of driving intensity if it is determined that the electronic device 200 is not located on the flat surface, a noise measuring unit 205 for measuring a background noise signal level including a vibration noise by using a microphone, a vibration motor control unit 207 for controlling the driving intensity of the vibration motor according to the measured background noise signal level. For example, if the background noise signal level including the vibration noise is less than a threshold, then the electronic device 200 increases the driving intensity of the vibration motor, and otherwise if the background noise signal level including the vibration noise is greater than the threshold, then the current driving intensity of the vibration motor is maintained.

Figure 3A:
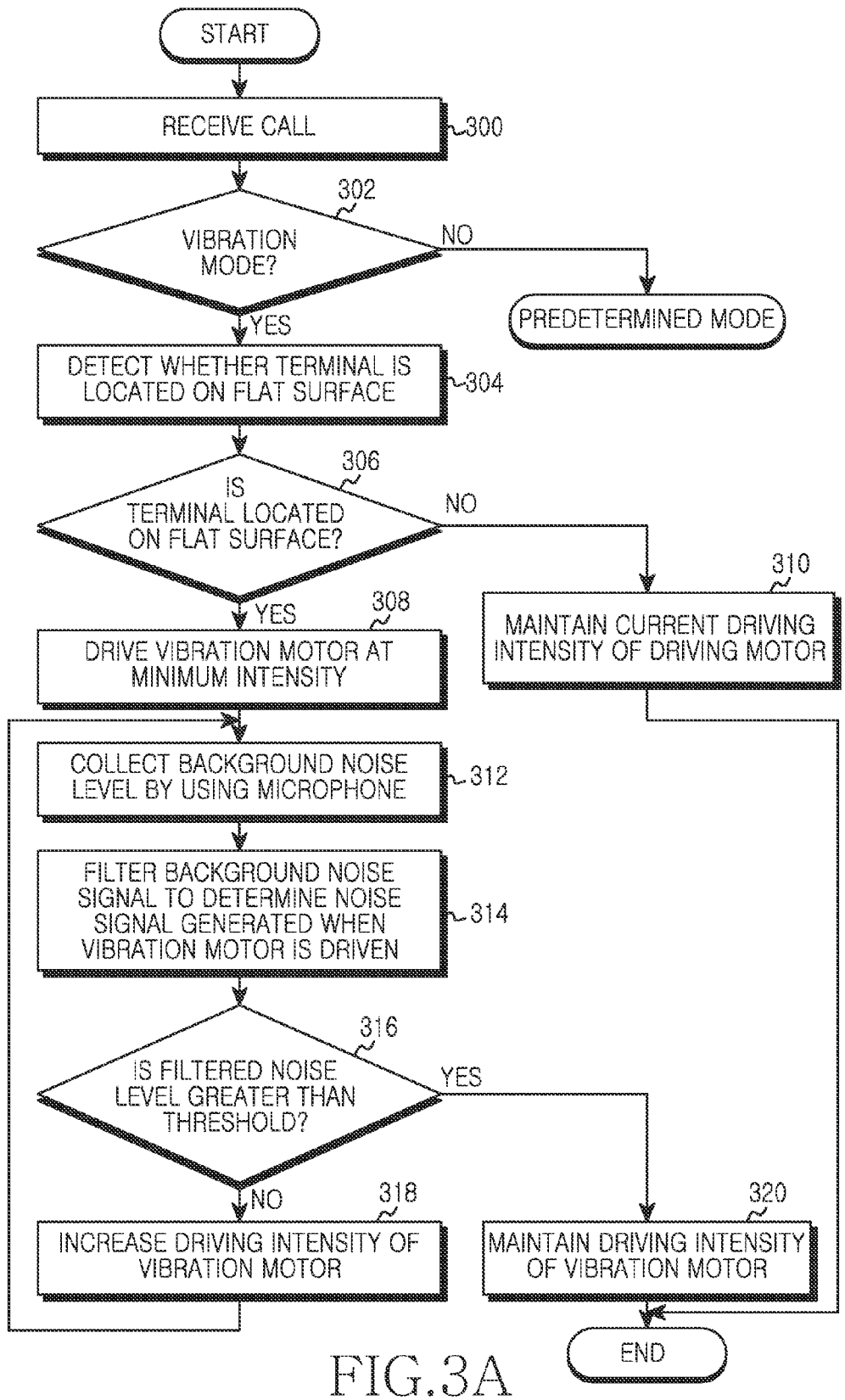
FIG. 3A is a flowchart illustrating a process of controlling a vibration intensity on the basis of situation awareness in an electronic device according to an exemplary embodiment of the present invention.

FIG. 3A is a flowchart illustrating a process of controlling a vibration intensity on the basis of situation awareness in an electronic device according to an exemplary embodiment of the present invention.

Referring to FIG. 3A, when an event, such as receiving a call, a text, an alarm, occurs in step 300, then the electronic device determines whether it is set to a vibration mode in step 302. If the electronic device is not set to the vibration mode in step 302, then a predetermined mode is performed.

For example, in the predetermined mode, the electronic device makes a bell sound for a call event.

Otherwise, if the electronic device is set to the vibration mode in step 302, then, in step 304, the electronic device detects whether the electronic device is currently located on a flat surface on the basis of a detection signal of a sensor before driving the vibration motor. Then, in step 306, the electronic device determines whether the electronic device is currently located on the flat surface by analyzing at least one of sensing results of the sensor.

If it is determined, in step 306, that the electronic device is not located on the flat surface, then, in step 310, the electronic device drives the vibration motor at a pre-set driving intensity by determining that the electronic device is located in a user's hand, bag, pocket, etc., and thus an excessive noise is not generated in this situation. That is, the electronic device vibrates while maintaining a current driving intensity of the vibration motor. Otherwise, if it is determined in step 306 that the electronic device is located on the flat surface, then, in step 308, the electronic device drives the vibration motor at a minimum level of the driving intensity. In step 312, the electronic device measures a background noise signal level including a vibration noise by using a microphone.

In step 314, the electronic device filters the background noise signal including the vibration noise to extract a signal corresponding to a vibration noise generated due to the vibration of the vibration motor.

In step 316, it is determined if the level of filtered background noise signal, i.e., the signal corresponding to the vibration noise, is less than a threshold, and then, in step 318, the electronic device increases the driving intensity of the vibration motor if the level of the filtered background noise is less than the threshold. Otherwise, if the filtered background noise signal level is greater than the threshold, then, in step 320, the current driving intensity of the vibration motor is maintained. In other words, if the filtered background noise signal level is large, it implies that a vibration noise caused by the vibration motor is large, and if the filtered background noise signal level is small, it implies that the vibration noise caused by the vibration motor is small. Therefore, when the vibration noise caused by the vibration motor is small, the current driving intensity of the vibration motor is increased, and when the vibration noise caused by the vibration motor is large, the driving intensity of the vibration motor is maintained to satisfy a current threshold. Thereafter, the procedure of FIG. 3A ends.

An instruction set for each step of FIG. 3A may be stored and executed in a manner similar to that of the instruction set for each step of FIG. 1A.

Figure 3B:
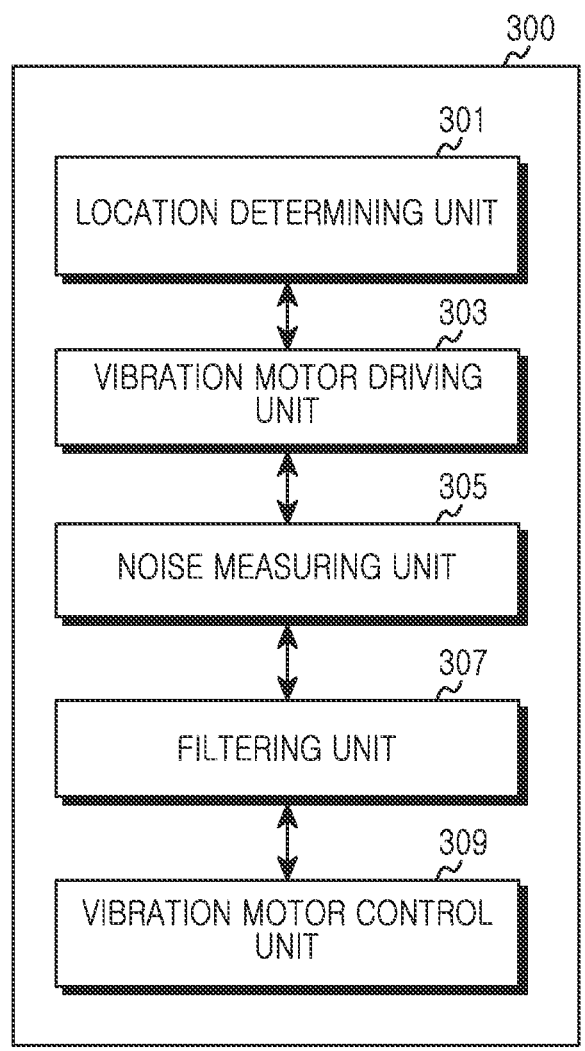
FIG. 3B is a block diagram illustrating an apparatus for controlling a vibration intensity on the basis of situation awareness in an electronic device according to an exemplary embodiment of the present invention.

FIG. 3B is a block diagram illustrating an apparatus for controlling a vibration intensity on the basis of situation awareness in an electronic device according to a third exemplary embodiment of the present invention.

An electronic device 300 includes a location determining unit 301 for determining whether the electronic device 300 is currently located on a flat surface on the basis of a detection signal of a sensor before driving the vibration motor, a vibration motor driving unit 303 for driving the vibration motor at a minimum level of driving intensity if it is determined that the electronic device 300 is not located on the flat surface, a noise measuring unit 305 for measuring a background noise signal level including a vibration noise by using a microphone, a filtering 307 for extracting a signal corresponding to the vibration noise generated due to the vibration motor by filtering the background noise signal including the vibration noise, and a vibration motor control unit 309 for controlling the driving intensity of the vibration motor according to the filtered background noise signal level. For example, if the filtered background noise signal level is less than a threshold, then the electronic device increases the driving intensity of the vibration motor, and otherwise if the filtered background noise signal level is greater than the threshold, then the current driving intensity of the vibration motor is maintained.

Figure 4A:
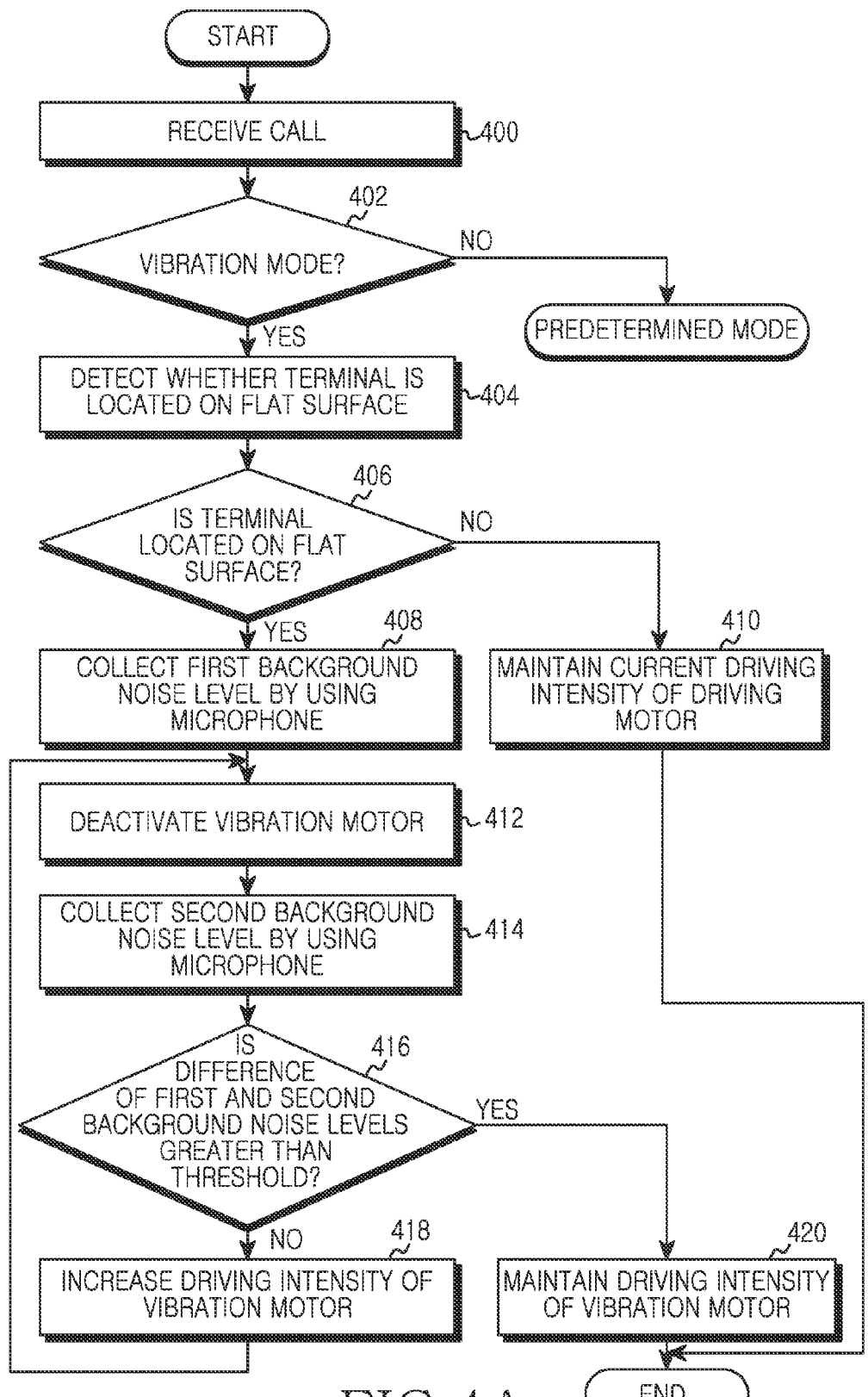
FIG. 4A is a flowchart illustrating a process of controlling a vibration intensity on the basis of situation awareness in an electronic device according to an exemplary embodiment of the present invention.

FIG. 4A is a flowchart illustrating a process of controlling a vibration intensity on the basis of situation awareness in an electronic device according to a fourth exemplary embodiment of the present invention.

Referring to FIG. 4A, when an event, such as receiving a call occurs in step 400, the electronic device determines whether it is set to a vibration mode in step 402. If the electronic device is not set to the vibration mode in step 402, then a predetermined mode is performed. For example, in the predetermined mode, the electronic device makes a bell sound for a call event.

Otherwise, if the electronic device is set to the vibration mode in step 402, then, in step 404, the electronic device detects whether the electronic device is currently located on a flat surface on the basis of a detection signal of a sensor before driving the vibration motor. Then, in step 406, the electronic device determines whether the electronic device is currently located on the flat surface by analyzing at least one of sensing results of the sensor.

If it is determined, in step 406, that the electronic device is not located on the flat surface, then, in step 410, the electronic device drives the vibration motor at a pre-set driving intensity by determining that the electronic device is located in a user's hand, bag, pocket, etc., and thus an excessive noise is not generated in this situation. That is, the electronic device vibrates while maintaining a current driving intensity of the vibration motor.

Otherwise, if it is determined, in step 406, that the electronic device is located on the flat surface, then, in step 408, the electronic device drives the vibration motor at a minimum level of the driving intensity, and measures a first background noise signal level including a vibration noise by using a microphone. The electronic device deactivates the vibration motor in step 412, and measures a second background noise signal level not including the vibration noise in step 414.

In step 416, it is determined whether a difference of the measured first background noise signal level including the vibration noise and the measured second background noise signal level not including the vibration noise is less than a threshold, and then, in step 418, the electronic device increases the driving intensity of the vibration motor if the measured first background noise signal level and the measured second background signal level is less than the threshold. Otherwise, if the difference of the measured first background noise signal level including the vibration noise and the measured second background noise signal level not including the vibration noise is greater than the threshold, then, in step 420, the current driving intensity of the vibration motor is maintained. In other words, if the difference of the measured first background noise signal level including the vibration noise and the measured second background noise signal level not including the vibration noise is large, it implies that a vibration noise caused by the vibration motor is large, and if the difference of the measured first background noise signal level including the vibration noise and the measured second background noise signal level not including the vibration noise is small, it implies that the vibration noise caused by the vibration motor is small. Therefore, when the vibration noise caused by the vibration motor is small, the current driving intensity of the vibration motor is increased, and when the vibration noise caused by the vibration motor is large, the driving intensity of the vibration motor is maintained to satisfy a current threshold. Thereafter, the procedure of FIG. 4A ends.

An instruction set for each step of FIG. 4A may be stored and executed in a manner similar to that of the instruction set for each step of FIG. 1A.

Figure 4B:
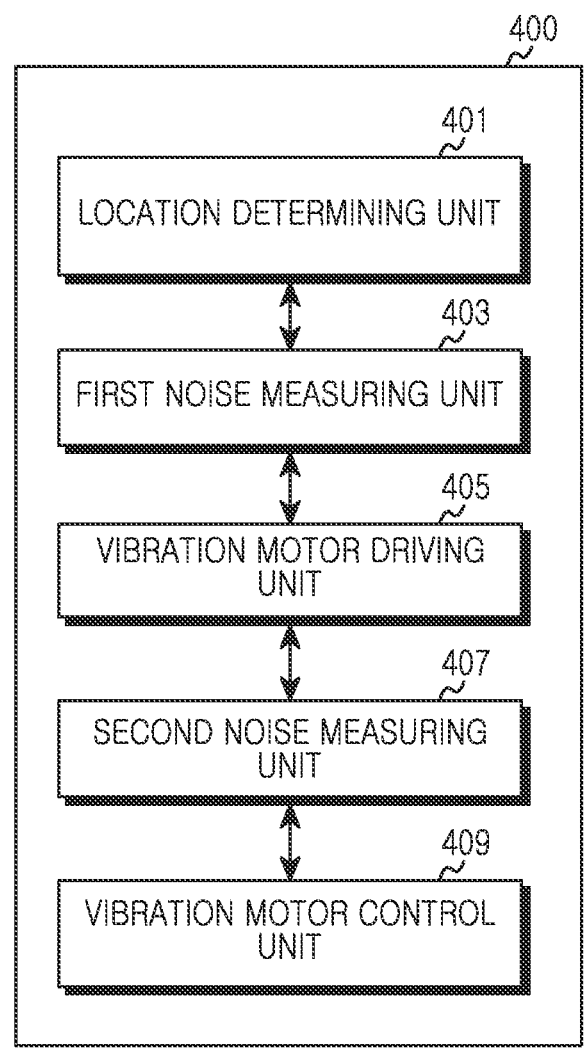
FIG. 4B is a block diagram illustrating an apparatus for controlling a vibration intensity on the basis of situation awareness in an electronic device according to an exemplary embodiment of the present invention.

FIG. 4B is a block diagram illustrating an apparatus for controlling a vibration intensity on the basis of situation awareness in an electronic device, in accordance with the method of the flowchart of FIG. 4A, according to a fourth exemplary embodiment of the present invention.

An electronic device 400 includes a location determining unit 401 for determining whether the electronic device 400 is currently located on a flat surface on the basis of a detection signal of a sensor before driving the vibration motor, a first noise measuring unit 403 for measuring a first background noise signal level including a vibration noise by using a microphone by driving the vibration motor at a minimum level of driving intensity if it is determined that the electronic device 400 is not located on the flat surface, a vibration motor driving unit 405 for deactivating the vibration motor, a second noise measuring unit 407 for measuring a second background noise signal level not including a vibration noise, and a vibration motor control unit 409 for controlling a driving intensity of the vibration motor according to a difference of the measured first background noise signal level including the vibration noise and the measured second background noise signal level not including the vibration noise. For example, the electronic device increases the driving intensity of the vibration motor if the difference of the measured first background noise signal level including the vibration noise and the measured second background noise signal level not including the vibration noise is less than the threshold. Otherwise, if the difference of the measured first background noise signal level including the vibration noise and the measured second background noise signal level not including the vibration noise is greater than the threshold, then the current driving intensity of the vibration motor is maintained.

FIG. 5 is a block diagram illustrating an electronic device according to an exemplary embodiment of the present invention.

Referring to FIG. 5, the electronic device may be a portable electronic device, and may be a device such as a portable terminal, a mobile phone, a mobile pad, a media player, a tablet computer, a handheld computer, a Personal Digital Assistant (PDA), or any other similar and/or suitable type of portable electronic device. In addition, the electronic device may be any portable electronic device including a device combining two or more functions among these devices.

The electronic device includes an external memory 570, a controller 500, a Global Positioning System (GPS) receiver 530, a Radio Frequency (RF) processor 540, a sensor module 550, a speaker/microphone 510, a camera 520, a touch screen 560, and a touch screen controller 565. However, the present invention is not limited thereto, and the electronic device may include other similar and/or suitable elements, units, and devices that may be included in a portable electronic device.

The controller 500 may include an interface 501, an application processor 502, a communication processor 503, and an internal memory 505. Optionally, the entire part of the controller 500 may be referred to as a processor. The interface 501, the application processor 502, the communication processor 503, and the internal memory 505 may be separate components or may be integrated into one or more integrated circuits.

The application processor 502 performs various functions for the electronic device by executing a variety of software programs, and the communication processor 503 processes and controls voice communication and data communication. In addition to such functions, the application processor 502 and the communication processor 503 also take a role of executing a specific software module, i.e., an instruction set, stored in the external memory 570 or the internal memory 505 and thus perform various functions corresponding to the module. That is, the application processor 502 and the communication processor 503 perform the method of the exemplary embodiments described above by interworking with software modules stored in the external memory 570 or the internal memory 505.

According to the exemplary embodiment of FIG. 1A, the application processor 502 determines whether the electronic device is currently located on a flat surface on the basis of a detection signal of a sensor before driving the vibration motor, drives the vibration motor at a minimum level of driving intensity if it is determined that the electronic device is not located on the flat surface, measures a first background noise signal level by using a microphone, filters the first background noise signal to remove a noise signal generated due to the vibration of the vibration motor from the first background noise signal which is input through the microphone, and controls the driving intensity of the vibration motor by comparing the difference of the second background noise signal level and the first background noise signal level with a threshold. The second background noise signal is a signal in which the noise signal generated due to the vibration of the vibration motor, i.e., the third noise signal, is removed from the first background noise signal.

For example, if a difference of a second background noise signal level and a first background noise signal level is less than a threshold, then the application processor 502 increases the driving intensity of the vibration motor, and otherwise if the difference of the second background noise signal level and the first background noise signal level is greater than the threshold, the current driving intensity of the vibration motor is maintained.

As described above, the application processor 502 drives the vibration motor at the minimum intensity to measure the first noise signal level including the vibration noise, and thereafter controls the driving intensity of the vibration motor by comparing the measurement result with the second noise signal level of which the vibration noise is filtered through the filter. According to another exemplary embodiment, before driving the vibration motor at the minimum intensity, the application processor 502 measures the first noise signal level not including the vibration noise, thereafter measures the second noise signal level including the vibration noise by driving the vibration motor at the minimum intensity, and thereafter removes the vibration noise by filtering the second noise signal. In addition, the driving intensity of the vibration motor may be controlled by comparing the first noise signal level, for a case where the vibration motor is not driven, with the filtered second noise signal level.

According to the exemplary embodiment of FIG. 2A, the application processor 502 determines whether the electronic device is currently located on a flat surface on the basis of a detection signal of a sensor before driving the vibration motor, drives the vibration motor at a minimum level of driving intensity if it is determined that the electronic device is not located on the flat surface, measures a background noise signal level including a vibration noise by using a microphone, and controls driving the driving intensity of the vibration motor according to the measured background noise signal level. For example, if the background noise signal level including the vibration noise is less than a threshold, then the electronic device increases the driving intensity of the vibration motor, and otherwise if the background noise signal level including the vibration noise is greater than the threshold, then the current driving intensity of the vibration motor is maintained.

According to the exemplary embodiment of FIG. 3A, the application processor 502 determines whether the electronic device is currently located on a flat surface on the basis of a detection signal of a sensor before driving the vibration motor, drives the vibration motor at a minimum level of driving intensity if it is determined that the electronic device is not located on the flat surface, measures a background noise signal level including a vibration noise by using a microphone, extracts a signal corresponding to the vibration noise generated due to the vibration motor by filtering the background noise signal including the vibration noise, and controls the driving intensity of the vibration motor according to the filtered background noise signal level. For example, if the filtered background noise signal level is less than a threshold, then the electronic device increases the driving intensity of the vibration motor, and otherwise if the filtered background noise signal level is greater than the threshold, then the current driving intensity of the vibration motor is maintained.

According to the exemplary embodiment of FIG. 4A, the application processor 502 determines whether the electronic device is currently located on a flat surface on the basis of a detection signal of a sensor before driving the vibration motor, measures a first background noise signal level including a vibration noise by using a microphone by driving the vibration motor at a minimum level of driving intensity if it is determined that the electronic device is not located on the flat surface, deactivates the vibration motor, measures a second background noise signal level not including a vibration noise, and controls a driving intensity of the vibration motor according to a difference of the measured first background noise signal level including the vibration noise and the measured second background noise signal level not including the vibration noise. For example, the electronic device increases the driving intensity of the vibration motor if the difference of the measured first background noise signal level including the vibration noise and the measured second background noise signal level not including the vibration noise is less than the threshold. Otherwise, if the difference of the measured first background noise signal level including the vibration noise and the measured second background noise signal level not including the vibration noise is greater than the threshold, then the current driving intensity of the vibration motor is maintained.

The interface 501 is connected to the touch screen controller 565 of the electronic device and the external memory 570. The sensor module 550 coupled to the interface 501 may enable various functions. For example, a motion sensor and an optical sensor may be coupled to the interface 501 to respectively enable motion sensing and external light-beam sensing. In addition thereto, other sensors, such as a location measurement system, a temperature sensor, a biometric sensor, or the like may be coupled to the interface 501 to perform related functions. In addition, the sensor module 550 senses whether the electronic device is located on the flat surface by using a sensor.

The camera 520 is coupled to the sensor module 550 via the interface 501, and may perform a camera function such as photographing, video clip recording, or similar functions of recording video and/or picture information. The RF processor 540 performs a communication function. For example, an RF signal is converted to a baseband signal under the control of the communication processor 503, and is then provided to the communication processor 503, or a baseband signal from the communication processor 503 is transmitted by being converted into an RF signal. Herein, the communication processor 503 processes the baseband signal by using various communication schemes. For example, although not limited thereto, the communication scheme may include a Global System for Mobile Communication (GSM) communication scheme, an Enhanced Data GSM Environment (EDGE) communication scheme, a Code Division Multiple Access (CDMA) communication scheme, a Wideband-Code Division Multiple Access (W-CDMA) communication scheme, a Long Term Evolution (LTE) communication scheme, an Orthogonal Frequency Division Multiple Access (OFDMA) communication scheme, a Wireless Fidelity (Wi-Fi) communication scheme, a Wireless Interoperability for Microwave Access (WiMAX) communication scheme, a Bluetooth communication scheme, or any other similar and/or suitable communication scheme.

The speaker/microphone 510 may input and output an audio stream for applications or operations such as voice recognition, voice reproduction, digital recording, video reproduction, music reproduction, audio file reproduction, telephony functions, and/or any other similar applications, operations or functions including audio and/or video information. That is, the speaker/microphone 510 converts an audio signal into an electronic signal or converts the electronic signal into the audio signal. Although not shown, an attachable and detachable ear phone, headphone, or headset may be connected to the electronic device via an external port.

The touch screen controller 565 may be coupled to the touch screen 560. Although not limited thereto, the touch screen 560 and the touch screen controller 565 may use not only capacitance, resistance, infrared and surface sound wave techniques for determining one or more contact points, but also any multi-touch sense technique including other proximity sensor arrays or other elements to detect a contact, a movement, or stopping thereof.

The touch screen 560 provides an input/output interface between the electronic device and the user. That is, the touch screen 560 delivers a touch input of the user to the electronic device. In addition, the touch screen 560 is an element which shows or displays an output from the electronic device to the user. That is, the touch screen shows or displays a visual output to the user. Such a visual output is represented in the form of a text, a graphic, a video, and a combination thereof.

A variety of displays may be used as the touch screen 560. For example, although not limited thereto, the touch screen 560 may include a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), a Flexible LED (FLED), or any other similar and/or suitable display device and/or display type.

The GPS receiver 530 converts a signal received from a satellite into information of a location, a speed, a time, etc. For example, a distance between the satellite and the GPS receiver is calculated by multiplying a speed of light by a signal arrival time, and a location of the electronic device is measured according to a principle of a well-known triangulation by obtaining a distance and a correct location of three satellites.

The external memory 570 or the internal memory 505 may include a fast random access memory, such as one or more magnetic disc storage devices and/or a non-volatile memory, one or more optical storage devices, a flash memory, or any other similar and/or suitable type of non-volatile computer readable storage medium.

The external memory 570 and/or the internal memory 505 store a software component. The software component includes an operating system software module, a communication software module, a graphic software module, a user interface software module, a Moving Picture Experts Group (MPEG) module, a camera software module, one or more application software modules, or any other similar and/or suitable module or software component. In addition, since a module, i.e., a software component, may be expressed as a group of instructions, the module may also be expressed as an instruction set. The module may be also expressed as a program.

The operating system software includes various software components for controlling a general system operation. The control of the general system operation includes memory management and control, storage hardware and/or device control and management, power control and management, and other similar and/or suitable operations. In addition, the operating system software performs a function for facilitating communication between various hardware elements and/or devices and software elements and/or modules.

The communication software module may enable communication with other electronic devices, such as a computer, a server, and/or a portable terminal, via the RF processor 540. Further, the communication software module may include a protocol structure conforming to a corresponding communication scheme. The graphic software module includes various software components for providing and displaying graphics on the touch screen unit 560. The displayed graphics may be a text, a web page, an icon, a digital image, a video, an animation, or any other similar and/or suitable graphical item or element that may be displayed on the touch screen unit 560. The user interface software module includes various software components related to the user interface. The user interface software module includes the content related to how a state of the user interface changes and in which condition the state of the user interface changes.

The camera software module includes a camera-related software component which enables camera-related processes and functions. The application module may include a browser application, an e-mail application, an instant message application, a word processing application, a keyboard emulation application, an address book application, a touch list application, a widget, a Digital Rights Management (DRM) application, a voice recognition application, a voice reproduction application, a location determining function, a location-based service, or any other similar and/or suitable application, function, or operation. The memories 570 and 505 may further include additional modules and/or instructions in addition to the aforementioned modules. Alternatively, optionally, some of the modules and/or instructions may not be used.

According to the exemplary embodiment of FIG. 1A, the application module determines whether the electronic device is currently located on a flat surface on the basis of a detection signal of a sensor before driving the vibration motor, drives the vibration motor at a minimum level of driving intensity if it is determined that the electronic device is not located on the flat surface, measures a first background noise signal level by using a microphone, filters the first background noise signal to remove a noise signal generated due to the vibration of the vibration motor from the first background noise signal which is input through the microphone, and controls the driving intensity of the vibration motor by comparing the difference of the second background noise signal level and the first background noise signal level with a threshold. The second background noise signal is a signal in which the noise signal generated due to the vibration of the vibration motor, i.e., the third noise signal, is removed from the first background noise signal.

For example, if a difference of a second background noise signal level and a first background noise signal level is less than a threshold, then the application module increases the driving intensity of the vibration motor, and otherwise if the difference of the second background noise signal level and the first background noise signal level is greater than the threshold, then the current driving intensity of the vibration motor is maintained.

As described above, the application module drives the vibration motor at the minimum intensity to measure the first noise signal level including the vibration noise, and thereafter controls the driving intensity of the vibration motor by comparing the measurement result with the second noise signal level of which the vibration noise is filtered through the filter. According to another exemplary embodiment, before driving the vibration motor at the minimum intensity, the application module measures the first noise signal level not including the vibration noise, thereafter measures the second noise signal level including the vibration noise by driving the vibration motor at the minimum intensity, and thereafter removes the vibration noise by filtering the second noise signal. In addition, the driving intensity of the vibration motor is controlled by comparing the first noise signal level for a case where the vibration motor is not driven with the filtered second noise signal level.

According to the exemplary embodiment of FIG. 2A, the application module determines whether the electronic device is currently located on a flat surface on the basis of a detection signal of a sensor before driving the vibration motor, drives the vibration motor at a minimum level of driving intensity if it is determined that the electronic device is not located on the flat surface, measures a background noise signal level including a vibration noise by using a microphone, and controls driving the driving intensity of the vibration motor according to the measured background noise signal level. For example, if the background noise signal level including the vibration noise is less than a threshold, then the electronic device increases the driving intensity of the vibration motor, and otherwise if the background noise signal level including the vibration noise is greater than the threshold, then the current driving intensity of the vibration motor is maintained.

According to the exemplary embodiment of FIG. 3A, the application module determines whether the electronic device is currently located on a flat surface on the basis of a detection signal of a sensor before driving the vibration motor, drives the vibration motor at a minimum level of driving intensity if it is determined that the electronic device is not located on the flat surface, measures a background noise signal level including a vibration noise by using a microphone, extracts a signal corresponding to the vibration noise generated due to the vibration motor by filtering the background noise signal including the vibration noise, and controls the driving intensity of the vibration motor according to the filtered background noise signal level. For example, if the filtered background noise signal level is less than a threshold, then the electronic device increases the driving intensity of the vibration motor, and otherwise if the filtered background noise signal level is greater than the threshold, then the current driving intensity of the vibration motor is maintained.

According to the exemplary embodiment of FIG. 4A, the application module determines whether the electronic device is currently located on a flat surface on the basis of a detection signal of a sensor before driving the vibration motor, measures a first background noise signal level including a vibration noise by using a microphone by driving the vibration motor at a minimum level of driving intensity if it is determined that the electronic device is not located on the flat surface, deactivates the vibration motor, measures a second background noise signal level not including a vibration noise, and controls a driving intensity of the vibration motor according to a difference of the measured first background noise signal level including the vibration noise and the measured second background noise signal level not including the vibration noise. For example, the electronic device increases the driving intensity of the vibration motor if the difference of the measured first background noise signal level including the vibration noise and the measured second background noise signal level not including the vibration noise is less than the threshold. Otherwise, if the difference of the measured first background noise signal level including the vibration noise and the measured second background noise signal level not including the vibration noise is greater than the threshold, then the current driving intensity of the vibration motor is maintained.

In addition, various functions of the electronic device of the exemplary embodiments described above may be performed by using one or more stream processors and/or a hardware components including an Integrated Circuit (IC), an Application Specific Integrated Circuit (ASIC), an Erasable Programmable Read Only Memory (EPROM), an Electrically EPROM (EEPROM), or any other similar and or suitable type of hardware element or non-volatile computer readable storage medium, and/or a software component and/or a combination thereof.

According to exemplary embodiments of the present invention, since vibration intensity is controlled by determining whether a portable terminal is located on a hard surface such as a desk, an excessive noise may be avoided when the portable terminal vibrates on the hard surface such as the desk.

It will be appreciated that exemplary embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and exemplary embodiments suitably encompass the same.

While the present invention has been particularly shown and described with reference to exemplary embodiments thereof, it will be understood by those skilled in the art that various changes in form and details may be made therein without departing from the spirit and scope of the present invention as defined by the appended claims and their equivalents.

What is claimed is:

1. A method of controlling vibration, the method comprising:
   receiving a call;
   determining whether an electronic device is set to a vibration mode;
   determining whether the electronic device is located on a flat surface if the electronic device is set to the vibration mode;
   driving a vibration motor at a first vibration intensity if the electronic device is located on the flat surface;
   measuring a noise signal level by using a microphone of the electronic device during receiving the call;
   filtering the measured noise signal level to remove a noise signal generated due to the vibration of the vibration motor;
   adjusting the driving intensity of the vibration motor to a second vibration intensity based on the filtered noise signal level; and
   repeating the measurement, the filtration and the adjustment during receiving the call,
   wherein the adjusting of the driving intensity of the vibration motor comprises:
     determining whether a difference of the measured noise signal level and the filtered noise signal level is less than a threshold,
     increasing the driving intensity of the vibration motor if the difference is less than the threshold, and
     maintaining a current driving intensity of the vibration motor if the difference is greater than the threshold.

2. The method of claim 1, wherein the determining of whether the electronic device is located on the flat surface comprises analyzing at least one detection signal by using at least one of an acceleration sensor, a gyroscopic sensor, or a proximity sensor.

3. The method of claim 1, further comprising:
   driving the vibration motor at a pre-set vibration intensity if the electronic device is not located on the flat surface.

4. A method of controlling vibration, the method comprising:
   receiving a call;
   determining whether an electronic device is set to a vibration mode;
   determining whether the electronic device is located on a flat surface if electronic device is set to the vibration mode;
   driving a vibration motor at a first vibration intensity if the electronic device is located on the flat surface;
   measuring a noise signal level by using a microphone of the electronic device during receiving the call;
   extracting a noise generated due to the driving of the vibration motor by filtering the noise signal;
   adjusting the driving intensity of the vibration motor to a second vibration intensity based on the noise; and
   repeating the measurement, the extraction and the adjustment during receiving the call,
   wherein the adjusting of the driving intensity of the vibration motor comprises:
     determining whether the noise is less than a threshold,
     increasing the driving intensity of the vibration motor if the noise is less than the threshold, and
     maintaining a current driving intensity of the vibration motor if the noise is greater than the threshold.

5. The method of claim 4, wherein the extracting of the noise generated due to the driving of the vibration motor by filtering the noise signal comprises:
   determining an oscillation frequency of the vibration motor,
   filtering a noise generated due to the driving of the vibration motor from the noise signal on the basis of the oscillation frequency of the vibration motor, and
   measuring the filtered noise signal level.

6. The method of claim 4, wherein the determining of whether the electronic device is located on the flat surface comprises analyzing at least one detection signal by using at least one of an acceleration sensor, a gyroscopic sensor, or a proximity sensor.

7. The method of claim 4, further comprising:
   driving the vibration motor at a pre-set vibration intensity if the electronic device is not located on the flat surface.

8. An electronic device comprising:
   a vibration motor;
   at least one processor;
   a memory; and
   at least one instruction set stored in the memory and configured to be executed by the at least one processor,
   wherein the at least one instruction set comprises:
     an instruction for receiving a call,
     an instruction for determining whether an electronic device is set to a vibration mode,
     an instruction for determining whether the electronic device is located on a flat surface if the electronic device is set to the vibration mode,
     an instruction for driving the vibration motor at a first vibration intensity if the electronic device is located on the flat surface,
     an instruction for measuring a noise signal level by using a microphone of the electronic device during receiving the call,
     an instruction for filtering the measured noise signal level to remove a noise signal generated due to the vibration of the vibration motor,
     an instruction for adjusting the driving intensity of the vibration motor to a second vibration intensity based on the measured noise signal level, and
     an instruction for repeating the measurement, the filtration, and the adjustment during receiving the call,
   wherein the instruction for the adjusting of the driving intensity of the vibration motor comprises:
     determining whether a difference of the measured noise signal level and the filtered noise signal level is less than a threshold, increasing the driving intensity of the vibration motor if the difference is less than the threshold, and maintaining a current driving intensity of the vibration motor if the difference is greater than the threshold.

9. The electronic device of claim 8, wherein the instruction for determining whether the electronic device is located on the flat surface comprises an instruction for analyzing at least one detection signal by using at least one of an acceleration sensor, a gyroscopic sensor, or a proximity sensor.

10. The electronic device of claim 8, wherein the at least one instruction set further comprises an instruction for driving the vibration motor at a pre-set vibration intensity if the electronic device is not located on the flat surface.

11. An electronic device comprising:
a vibration motor;
at least one processor;
a memory; and
at least one instruction set stored in the memory and configured to be executed by the at least one processor,
wherein the at least one instruction set comprises:
an instruction for receiving a call,
an instruction for determining whether an electronic device is set to a vibration mode,
an instruction for determining whether the electronic device is located on a flat surface if the electronic device is set to the vibration mode,
an instruction for driving the vibration motor at a first vibration intensity if the electronic device is located on the flat surface,
an instruction for measuring a noise signal level by using a microphone of the electronic device during receiving the call,
an instruction for extracting a noise generated due to the driving of the vibration motor by filtering the noise signal,
an instruction for adjusting the driving intensity of the vibration motor to a second vibration intensity based on the noise, and
an instruction for repeating the measurement, the extraction and the adjustment during receiving the call,
wherein the instruction for the adjusting of the driving intensity of the vibration motor comprises:
determining whether the noise is less than a threshold,
increasing the driving intensity of the vibration motor if the noise is less than the threshold, and
maintaining a current driving intensity of the vibration motor if the noise is greater than the threshold.

12. The electronic device of claim 11, wherein the instruction for extracting the noise generated due to the driving of the vibration motor by filtering the noise signal comprises:
an instruction for determining an oscillation frequency of the vibration motor,
an instruction for filtering a noise generated due to the driving of the vibration motor from the noise signal on the basis of the oscillation frequency of the vibration motor, and
an instruction for measuring the filtered noise signal level.

13. The electronic device of claim 11, wherein the instruction for determining whether the electronic device is located on the flat surface comprises an instruction for analyzing at least one detection signal by using at least one of an acceleration sensor, a gyroscopic sensor, or a proximity sensor.

14. The electronic device of claim 11, wherein the at least one instruction set further comprises an instruction for driving the vibration motor at a pre-set vibration intensity if the electronic device is not located on the flat surface.

* * * * *